Nov. 1, 1932.    C. W. RICE    1,885,546
LIQUID FILM SEAL
Filed July 22, 1927
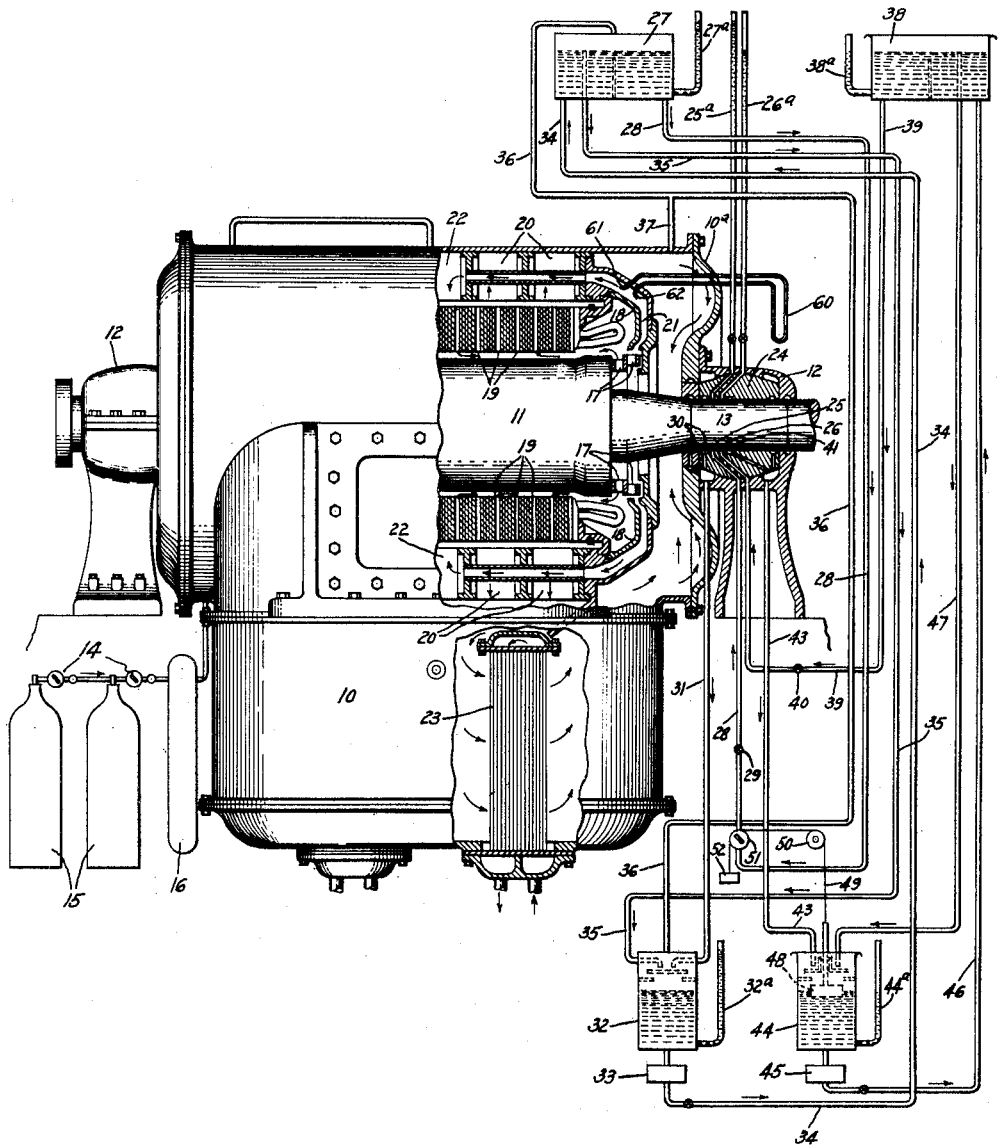
Inventor:
Chester W. Rice,
by *Alexander S. Lane*
His Attorney.

Patented Nov. 1, 1932

1,885,546

UNITED STATES PATENT OFFICE

CHESTER W. RICE, OF SCHENECTADY, NEW YORK, ASSIGNOR TO GENERAL ELECTRIC COMPANY, A CORPORATION OF NEW YORK

LIQUID FILM SEAL

Application filed July 22, 1927. Serial No. 207,800.

My invention relates to liquid film seals for use between the shaft and the enclosing casing of gas filled machines.

In dynamo-electric machines, for example, liquid seals have been employed between the shaft of the machines and the enclosing casing to prevent the escape of gas from the cooling system. In order to effectively maintain the seal and prevent overheating and evaporation of the liquid therein, liquid is continuously circulated through the seal during the operation of the machine. Although such an arrangement prevents the direct escape of gas from the casing, it does not entirely exclude air therefrom for the reason that the sealing liquid in passing through the outer end of the seal or a vented portion of the system absorbs air which is given off into the machine when the liquid flows through the end of the seal adjacent the enclosing casing. The carrying of air into the machine in this manner makes it necessary to supply gas to the machine and withdraw gas and air mixture therefrom until the percentage of air in the machine is made quite small, which occasions a loss of gas from the system. This is necessary for the reason that the presence of a substantial amount of air in the system increases the windage losses in the case of gases lighter than air, and the effect in general on other cooling mediums is to decrease their cooling effect. It is particularly important when hydrogen is used as a cooling medium to maintain a low percentage of air in the system as an explosion may occur if the proportion of gas to air therein becomes such as to form an explosive mixture. In my Patent 1,559,182 of Oct. 27, 1925 I have shown a system in which the sealing liquid is prevented from carrying air into the machine and carrying gas therefrom, by separating gas and air from the sealing liquid in the system.

The primary object of my present invention is to provide a liquid seal which will prevent air being carried into the interior of the machine by the sealing liquid and which will also effectively seal the enclosed machine and prevent a loss of gas therefrom. I accomplish this by providing a liquid seal in which two adjacent films of liquid are formed, one adjacent the interior of the machine which is saturated with the kind of gas within the ventilating system, and another saturated with air. By this arrangement the gas saturated film is not exposed to the air so that it does not absorb and carry air into the ventilating system, or give off gas outside the machine which would occasion a loss of gas therefrom.

Another object of my invention is to provide means for indicating the purity of the gas within an enclosed dynamo-electric machine of the type referred to in response to a flow of gas therein.

My invention will be more fully set forth in the following description referring to the accompanying drawing and the features of novelty which characterize my invention will be pointed out with particularity in the claims annexed to and forming a part of this specification.

The single figure of the drawing illustrates an enclosed dynamo-electric machine embodying my invention.

The enclosed dynamo-electric machine shown in the drawing comprises a gas filled casing 10 and a rotatable member 11 supported in bearing brackets 12 by a shaft 13 extending through the end walls 10a of the casing. Gas is supplied to the casing through control valves 14, when necessary, from any suitable source such as containers 15, and a suitable drier 16 may be included in the supply conduit for removing moisture from the gas. In order to effectively cool the machine the gas is circulated and recirculated within the casing by a fan 17 which is mounted on the rotatable member. A portion of the gas discharged from the fan is directed over the surface of the rotatable member by a deflecting wall 18 and thence outwardly through ducts 19 between the stator laminations to passages 20 between the laminations and the enclosing casing. Another portion of the gas discharged from the fan is directed through a passage 21 to another passage 22 between the laminations and the enclosing casing from which it passes inwardly to the surface of the rotatable member, and then outwardly into the passages 20. The gas then flows from the passages 20 over the surfaces of a cooler 23 through which a suitable medium is circulated for cooling the gas and thence to the intake of the fan 17, the flow of gas through the ventilating system being indicated in the drawing by arrows. This particular ventilating arrangement forms no part of my invention, and with the exception of the cooler, is substantially the same as that shown in the U. S. Patent to Holcombe, 1,269,537, of June 11, 1918.

In accordance with my invention air is prevented from being carried into the enclosed machine by the use of a liquid seal which forms two liquid films one of which is saturated with the kind of gas within the machine and the other of which is saturated with air. In the present embodiment of my invention these liquid films are formed between the shaft 13 of the rotatable member of the machine and a bearing member 24 by providing adjacent annular grooves 25 and 26 in the latter, supplying a liquid saturated with the kind of gas within the machine to the groove 25, and supplying the liquid saturated with air to the groove 26. The gas saturated liquid film is formed adjacent the interior of the machine by gas saturated liquid flowing in the groove 25 which prevents the direct escape of gas from the enclosing casing, and the adjacent air saturated film is formed by the air saturated liquid flowing in the groove 26 arranged between the gas saturated film and the exterior of the machine which prevents the gas saturated film from absorbing air and giving it off inside the machine. This arrangement reduces the amount of air carried into the machine through the liquid seal to a negligible amount because air passes from the air saturated film to the gas saturated film by diffusion which takes place slowly. Moreover air can be entirely prevented from entering the machine in this way by adjusting the seal so that there is a slight cross flow from the gas saturated film to the air saturated film which will cause only a slight loss of hydrogen from the machine.

In order to prevent excessive temperature rise in the bearing 24 when the dynamo-electric machine is running, which would vaporize the sealing liquid or impair its effectiveness, both the gas saturated liquid and the air saturated liquid which are supplied to these films are continuously circulated and recirculated therethrough from suitable pressure supply systems. For convenience of illustration, I have shown a system for supplying gas saturated liquid to the groove 25 as comprising a supply tank 27, which is arranged high enough above the bearing 24 to deliver sealing liquid to the groove 25 at the maximum desired head, but any well-known system for obtaining the desired pressure may be used. The liquid is supplied from the tank 27 through a feed pipe 28 having a suitable valve 29 therein so that the head at which the gas saturated liquid is delivered to the groove 25 may be adjusted as required. Adjacent the groove 25 through which the gas saturated liquid is supplied are two overflow grooves 30, both of which communicate by suitable ducts to an overflow pipe 31 leading to a drain receptacle and gas detrainer 32 arranged below the bearing bracket, so that liquid flows by gravity from the film supplied by the groove 25 through the grooves 30 and overflow pipe 31 to the drain receptacle and gas detrainer. In order to maintain a constant level in the supply tank 27 so that the head of the liquid supplied to the groove 25 shall remain constant a pump 33 continually delivers liquid through a conduit 34 to the supply tank 27 in excess of that required to supply the groove 25 through the supply pipe 28. The excess liquid is returned to the drain receptacle 32 through overflow pipe 35 which terminates in the supply tank 27 at the level of the liquid indicated in the drawing. The supply tank 27 and the drain receptacle 32 are both entirely closed and are connected above the liquid level in each by a conduit 36 which communicates at 27 to the interior of the casing 10 so that the liquid circulated between these receptacles and through the groove 25 will be saturated with the kind of gas within the cooling system, and the pressure of the gas above the liquid in the supply tank and in the drain receptacle will be equalized.

The system for supplying air saturated liquid to the groove 26 is similarly illustrated as comprising a supply tank 38 arranged above the bearing 24 high enough to supply liquid to the groove 26 at the head required through a supply pipe 39 having a control valve 40 therein but any other well-known system for obtaining the desired pressure may be employed. The liquid supplied to the groove 26 flows into the groove 41 which communicates by a duct with the overflow pipe 43 leading to a drain receptacle and gas detrainer 44. The head of the liquid supplied from the tank 38 to the groove 26 is maintained constant by maintaining the liquid level in the supply tank 38 constant. This is done by causing the pump 45 to deliver a greater amount of liquid through the conduit 46 to the suply tank 38 than is required to supply the groove 26 and returning the excess liquid to the drain receptacle by the overflow pipe 47 which terminates at the liquid level to be maintained in the supply tank 38. The supply tank 38 and the drain receptacle 44 are both open to the air so that the liquid supplied to the groove 26 from the system including the supply tank 38 and drain receptacle 44 is saturated with air.

In the event of a large pressure difference occurring between the groove 25 and the groove 26 it is apparent that there may be a flow of liquid directly from one of these grooves to the other so that liquid may flow between the system including the supply tank 27 and the system including the supply tank 38. If an exchange of liquid from one system to the other should continue for a time, either the hydrogen saturated liquid passing into the air saturated system would cause a loss of hydrogen from the cooling system, or the air saturated liquid passing into the hydrogen saturated system would admit air to the cooling system and reduce its efficiency. This difficulty is overcome in accordance with my invention by providing means for maintaining a definite ratio between the quantity of liquid in one of the systems to that in the other system. In the present embodiment of my invention this is accomplished by providing means for controlling a valve in the supply pipe 28 of the gas saturated liquid supply system for the groove 25 in response to variations in the level of the liquid in the drain receptacle 44 of the air saturated liquid supply system for the groove 26. The movement of the valve in response to the variations in the level of the liquid in the receptacle 44 is controlled by a float 48 connected to a cable 49 which extends over a guide pulley 50 and valve wheel 51. A weight 52 is attached to the end of the cable 49 extending over the valve wheel 51 so that the valve connected to the wheel 51 is closed as the liquid level is raised in the receptacle 44 and is opened as the liquid level is lowered in the receptacle. It is to be noted that the quantity of liquid in the supply tanks 27 and 38 is maintained the same at all times because of the overflow pipes 35 and 47, and the quantity of liquid in the pipes of the systems will also remain substantially constant at all times. For this reason, if there should be a variation in the amount of liquid in either of the systems it would be immediately indicated by a change in the level of the liquid in the drain receptacles 32 and 44. In the arrangement which I have provided, a rise in the level of the liquid in the drain receptacle 44 of the air saturated liquid supply system, which indicates an increase in the quantity of liquid therein, tends to close the valve connected to the wheel 51 and diminish the pressure at which liquid is supplied from the supply tank 27 to the groove 25. The drop of pressure in the groove 25 will cause liquid to flow from the groove 26 to the groove 25 and this will continue until the level in the drain receptacle 44 has been lowered sufficiently to open the valve connected to the wheel 51 and again establish equilibrium between the grooves 25 and 26 so that there will be no flow of liquid between them. A lowering of the level of the liquid in the receptacle 44 opens the valve in pipe 28 and increases the pressure of the liquid in groove 25 so that liquid flows into the groove 26 and the remainder of its supply system until the liquid in drain receptacle 44 reaches its normal level for which the float 48 is adjusted. It will thus be seen that the quantity of liquid in the air saturated liquid supply system will be maintained in accordance with the adjustment of the float 48 and that this may be made any desired ratio to the quantity of liquid in the gas saturated liquid supply system. It is apparent that such a float for controlling a valve in the supply conduit 39 can also be used in the drain receptacle 32, instead of the described arrangement.

The adjustment of the pressure of the gas saturated liquid supplied to the groove 25 and the pressure of the air saturated liquid supplied to the groove 26 to a valve which will prevent the cross flow of liquid between to the grooves is facilitated in my construction by providing gages 25a and 26a communicating with the grooves 25 and 26 respectively. The pressure and the liquid level in the supply tanks are indicated by the open tubes 27a and 38a respectively, while the pressure and the liquid level in the drain receptacles 32 and 44 respectively are indicated by the open tubes 32a and 44a.

In the operation of the dynamo-electric machine the gas within the casing 10 is circulated through the machine and the cooler 23 by the fan 17 carried by the rotatable member 11. Gas saturated liquid is supplied to the groove 25 from the supply tank 27 so as to maintain an effective gas saturated sealing liquid film which will prevent the direct escape of gas from the casing 10 between the shaft 13 of the rotatable member and the bearing 24. The liquid supplied to the groove 25 will flow over the surface of the shaft to the grooves 30 and thence through the drain pipe 31 to the drain receptacle 32, so that the gas saturated liquid will not flow into the interior of the machine. The gas saturated liquid in the drain receptacle 32 will be returned to the supply tank 27 by a pump 33 at a rate in excess of that supplied through the supply pipe 28 to the groove 25, and the excess liquid will be returned to the drain receptacle through the overflow pipe 35 which terminates at the liquid level in the supply tank 27. The gas saturated liquid which is supplied to the groove 25 is prevented from coming into contact with the outside air and giving up the gas with which it is saturated, by the adjacent air saturated liquid seal, which is formed by the air saturated liquid supplied to the groove 26. The pressure in the grooves 25 and 26 is so adjusted that there will be substantially no flow of liquid between them or so that there will be a very slight flow of gas saturated liquid from the groove 25 to the groove 26. The flow of gas saturated liquid from the groove 25 to the groove 26 will be very slow so that it will not cause a substantial loss of gas from the cooling system. The cross flow of gas saturated liquid between the grooves 25 and 26 can be insured by providing a bleeder tube on the drain receptacle or detrainer 44 through which liquid may be slowly withdrawn. This will lower the float 48, and open the valve connected to the wheel 51, which will cause a slow cross flow from the groove 25 to the groove 26, as previously explained, resulting in a slight loss of liquid from the gas saturated supply system. However, this loss of liquid from the gas saturated system can be made up with gas saturated or vacuum treated liquid. The air saturated film is maintained by supplying air saturated liquid from the supply tank 38 to the groove 26, and liquid from the air saturated film flows from the groove 26 to the drain receptacle 44 through the overflow pipe 43. The liquid level in the supply tank 38 is maintained by the pump 45 which delivers liquid to the supply tank in excess of that required to supply the groove 26, and the excess liquid is returned to the drain receptacle by an overflow pipe 47 which terminates at the liquid level in the supply tank. The ratio of the quantity of liquid in the system including the drain receptacle 32 and the system including the drain receptacle 44 is maintained by the action of the float 48, which controls the valve in the supply pipe 28 leading to the groove 25 to maintain a constant liquid level in the drain receptacle 44 and prevents excessive interchange of liquid between the systems as previously explained It is important in the operation of a cooling system of this character that the attendant be able to ascertain accurately the purity of the cooling gas within the closed system for the reason that the admission of air to the system will impair the effectiveness of the cooling medium and in the case of a hydrogen cooling system may be dangerous. In accordance with my invention a very simple arrangement is provided for directly indicating the purity of the gas in the cooling system. This is done by circulating the cooling gas within the enclosed casing at a constant rate, so that the velocity of the cooling gas through any portion of the system will at all times remain substantially constant. I then provide means for indicating the velocity head of the cooling gas flowing through a portion of the circulating system. As the rate of circulation of the cooling gas through the system is maintained constant the velocity head of the gas in this portion of the system will remain constant so long as there is no change in the density of the gas. However, if there is a variation in the density of the cooling gas it is apparent this will cause a variation in the velocity head indication and it may be readily calibrated to indicate the density or purity of the cooling gas within the system. In the embodiment of my invention shown in the drawing the dynamo-electric machine is operated at constant speed so that the fan 17 circulates the cooling gas at a constant rate. The velocity head indicating means is arranged to indicate the velocity head of the gas flowing through the passage 21 and comprises two Pitot tubes 61 and 62, the former of which opens in the direction of flow of gas in the passage 21, and the latter of which opens in the opposite direction to the flow of gas in the passage. Each of these Pitot tubes is connected to an arm of a U-tube 60, or any other suitable device for indicating a difference in pressure between the tubes 61 and 62, which is calibrated to indicate the density or purity of the gas within the cooling system.

In the liquid film seal which I have described it is apparent that modifications may be made by those skilled in the art of the supply systems and the arrangement of the grooves for forming sealing films, and that any suitable cooling medium may be used in the machine. I desire it to be understood, therefore, that my invention is not limited to the particular arrangement shown and described, and I intend in the appended claims to cover all modifications which do not depart from the spirit and scope of my invention.

What I claim as new and desire to secure by Letters Patent of the United States, is:—

1. In combination, an enclosed machine comprising a gas filled casing and a rotatable member having a shaft extending through said casing, and means for forming a liquid seal, said sealing means comprising a liquid film saturated with the kind of gas within said casing and introduced between said casing and said shaft and an air saturated film introduced between said casing and said shaft between said first-mentioned liquid film and the exterior of said machine.

2. In combination, an enclosed machine comprising a gas filled casing and a rotatable member having a shaft extending through said casing, and means for forming a liquid seal, said sealing means comprising a liquid circulatory system including a liquid film saturated with the kind of gas within said casing and introduced between said casing and said shaft and a liquid circulatory system including an air saturated liquid film introduced between said casing and said shaft between said first-mentioned liquid film and the exterior of said machine.

3. In combination, an enclosed machine comprising a gas filled casing and a rotatable member having a shaft extending through said casing, and means for forming a liquid seal between said casing and said shaft to prevent the escape of gas from the casing, said sealing means comprising a liquid circulatory system including means for forming a gas saturated liquid film and a liquid circulatory system including means for forming an air saturated liquid film, and means for maintaining a substantially constant ratio between the amounts of liquid in said circulatory systems.

4. In combination, an enclosed machine comprising a gas filled casing and a rotatable member having a shaft extending through said casing, and means for forming a liquid seal between said casing and said shaft to prevent the escape of gas from the casing, said sealing means comprising a liquid circulatory system including means for forming a gas saturated liquid film and a liquid circulatory system including means for forming an air saturated liquid film, one of said circulatory systems including a receptacle the other of said circulatory systems having a valve therein, and means responsive to changes in level of liquid in said receptacle for controlling said valve to maintain a definite ratio between the amounts of liquid in said systems.

5. In combination, an enclosed machine comprising a gas filled casing and a rotatable member having a shaft extending through said casing, means for forming a liquid seal between said casing and said shaft to prevent the escape of gas from the casing, said sealing means comprising a member having adjacent grooves therein, means for supplying liquid saturated with the kind of gas within the casing to certain of said grooves, and means for supplying liquid saturated with air to the other of said grooves.

6. In combination, an enclosed machine comprising a gas filled casing and a rotatable member having a shaft extending through said casing, means for forming a liquid seal between said casing and said shaft to prevent the escape of gas from the casing, said sealing means comprising a member having a plurality of grooves therein, means for supplying gas saturated liquid at constant head to certain of said grooves, means for supplying air saturated liquid at constant head to others of said grooves, each of said liquid supplying means including a reservoir above said grooved member, the reservoir for supplying gas saturated liquid being closed and communicating with the interior of said machine.

7. In combination, an enclosed machine comprising a gas filled casing and a rotatable member having a shaft extending through said casing, and means for forming a liquid seal between said casing and said shaft to prevent the escape of gas from said casing, said sealing means comprising a liquid circulatory system including means for forming a gas saturated liquid film and a liquid circulatory system including means for forming an air saturated liquid film, each of said circulatory systems including a source of liquid above said films and a drain receptacle below said films into which liquid therefrom discharges.

8. In combination, an enclosed machine comprising a gas filled casing and a rotatable member having a shaft extending through said casing, means forming a liquid seal between said casing and said shaft to prevent the escape of gas from the casing, said sealing means comprising a member having a plurality of grooves therein, means including a circulatory system communicating with the interior of said machine for supplying gas saturated liquid at constant head to certain of said grooves, and means including a circulatory system for supplying air saturated liquid at constant head to others of said grooves, each of said circulatory systems including a source of liquid supply above said grooved member and a drain receptacle below said grooved member communicating with a groove adjacent that to which liquid is supplied.

9. In combination, an enclosed machine comprising a gas filled casing and a rotatable member having a shaft extending through said casing, means forming a liquid seal between said casing and said shaft to prevent the escape of gas from the casing, said sealing means comprising a member having a plurality of grooves therein, means including a circulatory system communicating with the interior of said machine for supplying gas saturated liquid at constant head to certain of said grooves adjacent the interior of said machine, means including a circulatory system for supplying air saturated liquid at constant head to others of said grooves between said first mentioned grooves and the exterior of said machine, each of said circulatory systems including a source of liquid supply above said grooved member and a drain receptacle below said grooved member communicating with a groove adjacent that to which liquid is supplied and means for maintaining a definite ratio between the quantities of liquid in said circulatory systems.

10. In combination, an enclosed machine comprising a gas filled casing and a rotatable member having a shaft extending through said casing, means forming a liquid seal between said casing and said shaft to prevent the escape of gas from the casing, said sealing means comprising a member having a plurality of grooves therein, means including a circulatory system communicating with the interior of said machine for supplying gas saturated liquid at constant head to certain of said grooves adjacent the interior of said machine, means including a circulatory system for supplying air saturated liquid at constant head to others of said grooves between said first mentioned grooves and the exterior of said machine, each of said circulatory systems including a source of liquid supply above said grooved member and a drain receptacle below said grooved member communicating with a groove adjacent that to which liquid is supplied, and means for varying the flow from one of said liquid supply means to said grooved member in response to variations in level in the drain receptacle of the other supply means in order to maintain a definite ratio between the quantity of liquid in said gas saturated and in the air saturated liquid supplying means.

In witness whereof, I have hereunto set my hand this 21st day of July, 1927.

CHESTER W. RICE.

CERTIFICATE OF CORRECTION.

Patent No. 1,885,546.  November 1, 1932.

CHESTER W. RICE.

It is hereby certified that error appears in the printed specification of the above numbered patent requiring correction as follows: Page 3, line 82, for "valve" read "value"; page 5, line 34, claim 5, for "other" read "others"; and that the said Letters Patent should be read with these corrections therein that the same may conform to the record of the case in the Patent Office.

Signed and sealed this 29th day of November, A. D. 1932.

M. J. Moore,
Acting Commissioner of Patents.

(Seal)